(12) United States Patent
Kim

(10) Patent No.: US 8,719,498 B2
(45) Date of Patent: May 6, 2014

(54) DATA STORAGE DEVICE AND DATA PROVIDING METHOD THEREIN

(75) Inventor: Kwang Jun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 12/126,663

(22) Filed: May 23, 2008

(65) Prior Publication Data

US 2009/0055581 A1 Feb. 26, 2009

(30) Foreign Application Priority Data

Aug. 24, 2007 (KR) ........................ 10-2007-0085753
Jan. 8, 2008 (KR) ........................ 10-2008-0002257

(51) Int. Cl.
*G06F 12/02* (2006.01)
(52) U.S. Cl.
USPC ............ 711/115; 711/103; 711/104; 711/154
(58) Field of Classification Search
USPC .................. 711/103, 104, 115, 154
See application file for complete search history.

(56) References Cited

U.S. PATENT DOCUMENTS

| | | | |
|---|---|---|---|
| 5,175,842 A | 12/1992 | Totani | |
| 5,860,083 A | 1/1999 | Sukegawa | |
| 6,370,645 B1 | 4/2002 | Lee | |
| 2004/0070608 A1* | 4/2004 | Saka ............................ | 345/748 |
| 2004/0095382 A1* | 5/2004 | Fisher et al. .................. | 345/744 |
| 2004/0205123 A1* | 10/2004 | Terasawa ...................... | 709/203 |
| 2005/0086419 A1* | 4/2005 | Neble et al. ................... | 711/100 |
| 2006/0080501 A1 | 4/2006 | Auerbach | |
| 2006/0130004 A1* | 6/2006 | Hughes et al. ................ | 717/131 |
| 2006/0248252 A1* | 11/2006 | Kharwa ........................ | 710/303 |
| 2006/0281556 A1* | 12/2006 | Solomon et al. ................ | 463/43 |
| 2006/0294357 A1 | 12/2006 | Choo | |
| 2007/0016725 A1 | 1/2007 | Chu | |
| 2007/0174545 A1* | 7/2007 | Okada et al. .................. | 711/112 |
| 2007/0250778 A1* | 10/2007 | Saito et al. ................... | 715/733 |
| 2008/0086491 A1* | 4/2008 | Wang et al. ................... | 707/101 |
| 2008/0120501 A1* | 5/2008 | Jannink et al. ................ | 713/163 |
| 2008/0250190 A1* | 10/2008 | Johnson ........................ | 711/103 |

FOREIGN PATENT DOCUMENTS

| | | |
|---|---|---|
| KR | 10-2005-0006003 | 1/2005 |
| KR | 10-2006-0067815 | 6/2006 |

OTHER PUBLICATIONS

Johannes Helmig, "USB Networking Indroduction", Jan. 7, 2001, WindowsNetworking.com. Retrieved on May 3, 2012 from <http://www.windowsnetworking.com/articles_tutorials/usbmain.html?printversion>.*

* cited by examiner

*Primary Examiner* — Arpan P. Savla
(74) *Attorney, Agent, or Firm* — NSIP Law

(57) ABSTRACT

A data storage device, the data storage device may include: a data storage unit; a system data storage unit that stores an application program, an operating system (OS), and management information related to a processing of the stored data; a system control unit that performs an initialization, a control, and a system setting of the device; a central processing unit (CPU) that performs data processing including data read and data write and processes an instruction word; a random access memory (RAM) that loads the data from the data storage unit and the system data storage unit, loads the instruction word of the CPU, and temporarily stores a data processing result of the processed instruction word; and an output determination unit that determines to output at least one of the data stored in the data storage unit, the application program, and the data processing result.

30 Claims, 12 Drawing Sheets

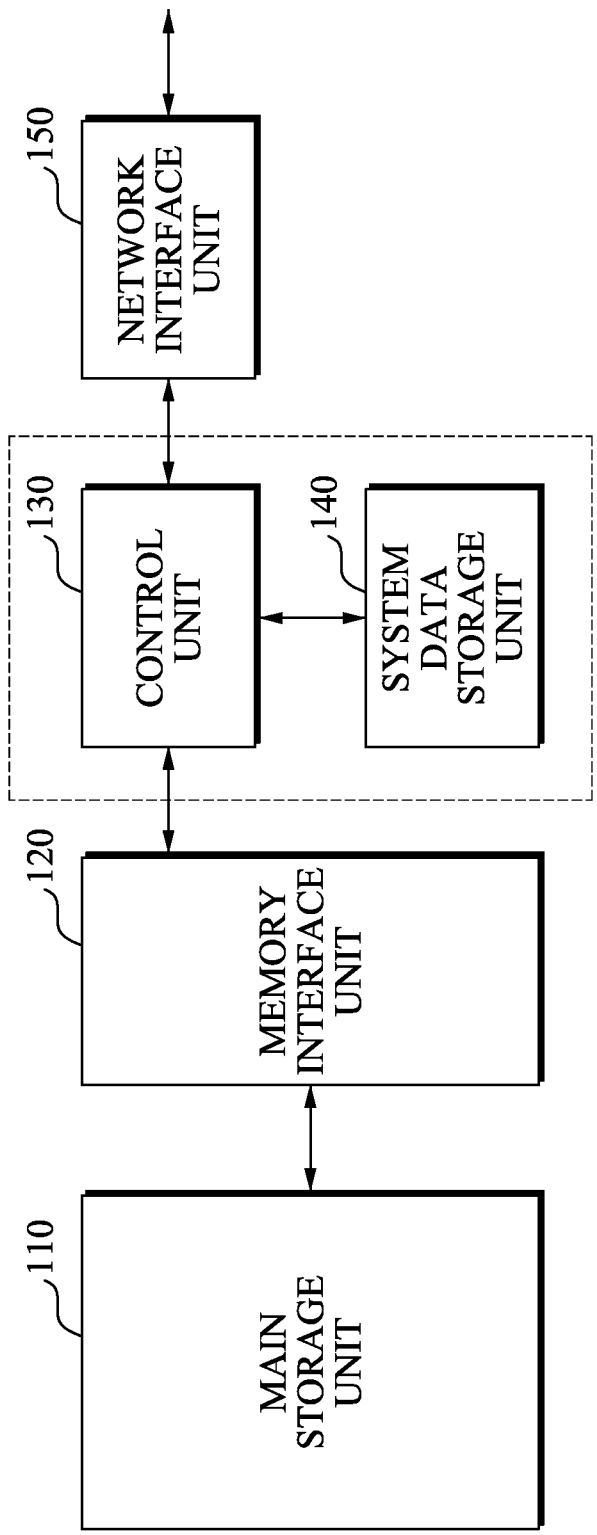

FIG. 5

| DATA TYPE | OS | APPLICATION PROGRAM | REFERENCE |
|---|---|---|---|
| jpg | Windows XP® | mpaint_xp_1.exe | |
| | Linux® | mpaint_linux_1.exe | |
| | ... | ... | |
| ... | ... | ... | |
| mpg | Windows XP® | media_player_xp_1.exe | |
| | | media_editor_1.exe | optional |
| | Linux® | media_player_linux_1.exe | |
| | ... | ... | |

DATA STORAGE DEVICE AND DATA PROVIDING METHOD THEREIN

PRIORITY STATEMENT

This application claims priority from Korean Patent Application No. 10-2007-0085753, filed on Aug. 24, 2007, in the Korean Intellectual Property Office (KIPO), and Korean Patent Application No. 10-2008-0002257, filed on Jan. 8, 2008, in the KIPO, the entire contents of which are incorporated herein by reference.

FIELD

The invention relates to data storage devices and/or data providing methods. In particular, the technology relates to data storage devices that may provide user data by including their own operating systems (OSs) and application software, may provide the user data and software processing the user data, or may provide data of a processing result of the application software, and/or data providing methods in the storage devices.

BACKGROUND

Currently, a storage device including a portability-emphasized external hard disk and the like is widely used with a Universal Serial Bus (USB) interface as an auxiliary storage device, and a complex product enabling a multimedia replaying device including a Portable Multimedia Player (PMP), a Moving Picture Experts Group Audio Layer 3 player (MP3P), and the like to be used as a mobile data storage device has been introduced due to a convergence trend of electronic products.

The storage device generally improves a data access speed by adding a flash memory to a hard disk and storing frequently-used data in the flash memory, or enables the storage device to be used as an independent storage device by installing an operating system (OS) in the hard disk or the flash memory.

However, a storage device that selects data requested by a user and application software necessary for processing the data in accordance with a feature of a user system requesting the data, and provides both the data and the application software may be desirable.

Specifically, a conventional portable storage device may store the OS, the application software, or the data in the hard disk or the flash memory, and replay and process the data in its own device. However, the conventional portable storage device may not adaptively provide the application software appropriate for the data requested by the user and the application software appropriate for the user system by including an independent data server function.

Specifically, the conventional portable storage device may select the hard disk or the flash memory as the auxiliary storage device, and store the OS, the application software, or the data in the hard disk or the flash memory. Also, the conventional portable storage device may load the OS using an external main central processing unit (CPU) of the auxiliary storage device, and replay or process the data of the auxiliary storage device. However, the conventional portable storage device may not adaptively provide the data requested by the user and the application software appropriate for the user system by including an auxiliary storage device function and a data server function, as an independent device having the hard disk or the flash memory, and a CPU that may load its own OS.

SUMMARY

Example embodiments may provide data storage devices that provide data requested by a user, more particularly, that provide the requested data and application software related to a processing of the requested data, or provide data of a processing result of the application software.

Example embodiments may include methods in storage devices to provide data requested by a user and application software related to a processing of the requested data with reference to management information related to the processing of the data requested by the user, or to provide data of a processing result of the application software.

According to example embodiments, a data storage device may include: a data storage unit; a system data storage unit that stores an application program, an operating system (OS), and management information related to processing of the stored data; a system control unit that performs an initialization, a control, and a system setting of the device; a central processing unit (CPU) that performs data processing including data read and data write and processes an instruction word; a random access memory (RAM) that loads the data from the data storage unit and the system data storage unit, loads the instruction word of the CPU, and temporarily stores a data processing result of the processed instruction word; and an output determination unit that determines to output at least one of the data stored in the data storage unit, the application program, and the data processing result.

According to example embodiments, a data storage device may include: a main storage unit that stores data; a system data storage unit that stores management information related to a processing of the data; and a control unit that controls the main storage unit, controls an OS and application software installed in the storage device, and controls the storage device to provide the data requested by a user, or to provide the requested data and the application software related to a processing of the requested data with reference to the management information, or to provide data of a processing result of the application software.

The storage device may further include a network interface unit that receives the data requested by the user from the control unit and transmits the received data.

Also, the main data storage unit or the system data storage unit may be a mass storage device in a hard disk form, in an SSD form using a semiconductor device including a flash memory, in an optical disk form, or other forms.

The control unit may include: a determination unit that determines the data type requested by the user and the user system feature; and a transmission management unit that reads the application software, which corresponds to the management information, in the main storage unit or the system data storage unit with reference to the management information read by the system data storage unit based on the data type and the user system feature determined by the determination unit, and provides the application software.

According to example embodiments, a data storage device may include: a data storage unit that stores data and management information related to a processing of the data; and a control unit that controls the data storage unit, controls an OS and application software installed in the storage device, and controls the storage device to provide the data requested by a user, or to provide the requested data and the application software related to a processing of the requested data with reference to the management information, or to provide data of a processing result of the application software.

According to example embodiments, a data providing method in a storage device may include: receiving a data providing request from a user; and providing the data and application software related to a processing of the requested data with reference to the management information related to the processing of the requested data, or providing data of a processing result of the application software.

BRIEF DESCRIPTION OF THE DRAWINGS

The above and/or other aspects, and advantages will become more apparent and more readily appreciated from the following detailed description of example embodiments, taken in conjunction with the accompanying drawings, in which:

FIG. 1A is a block diagram illustrating a data storage device according to an example embodiment;

FIG. 5 is a table illustrating management information according to an example embodiment;

DETAILED DESCRIPTION OF EXAMPLE EMBODIMENTS

Figure 1B:
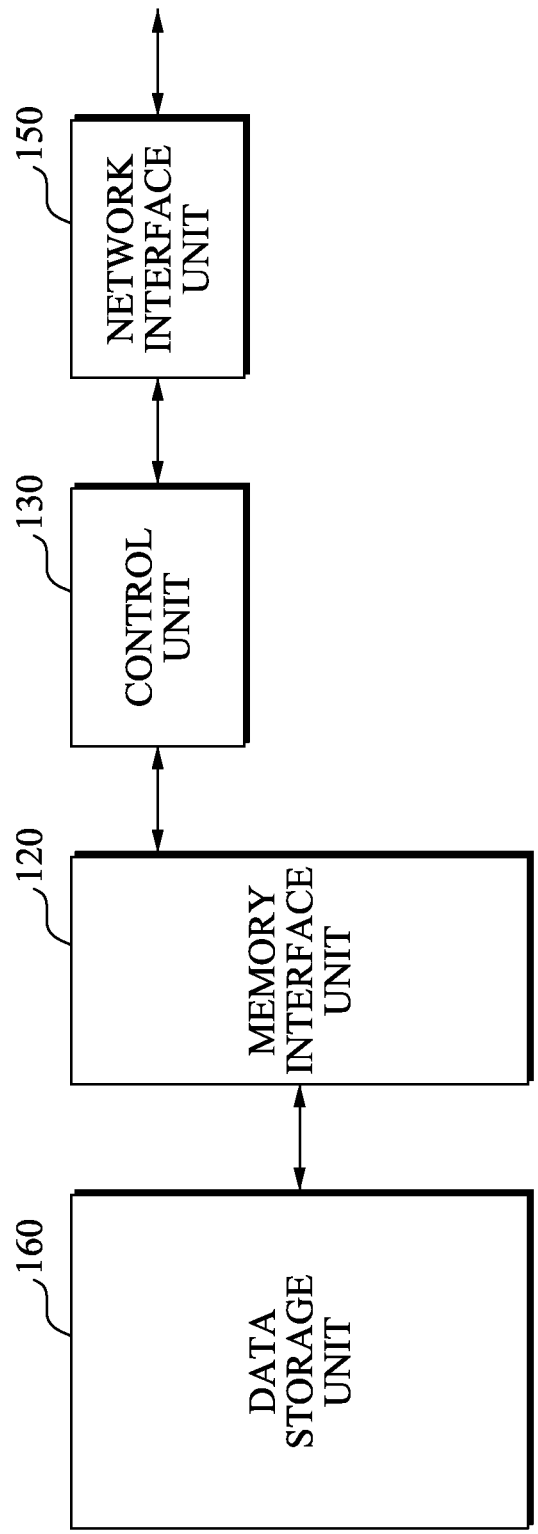
FIG. 1B is a block diagram illustrating a data storage device according to another example embodiment.

Example embodiments will now be described more fully with reference to the accompanying drawings. Embodiments, however, may have different configurations, features and/or forms and should not be construed as being limited to example embodiments set forth herein. Rather, these example embodiments are provided so that this disclosure will provide some examples that convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/of" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined herein, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals refer to like components throughout.

FIG. 1A is a block diagram illustrating a data storage device according to an example embodiment.

Referring to FIG. 1A, the data storage device according to the present example embodiment includes a main storage unit 110, a memory interface unit 120, a control unit 130, a system data storage unit 140, and a network interface unit 150.

The main storage unit 110 stores user data and the like as a mass storage device. The main storage unit 110 may be a storage medium including a conventional general mass storage device such as a hard disk and an optical disk, a memory card, and the like. Also, a storage device having an access speed lower than a data access speed of the system data storage unit 140 and being inexpensive may be used as the main storage unit 110. A mass storage device in a Solid State Disk (SSD) form using a semiconductor device including a dynamic random access memory (DRAM), a flash memory, and the like has been recently developed, and an SSD may be used for the main storage unit 110. In this case, the data access speed improves. Also, an optical disk and the like may be used. Various user data including text data, image data, movie data, audio data, and the like are stored in the main storage unit 110.

The memory interface unit 120 controls a data input/output between the control unit 130 and the main storage unit 110. For example, the memory interface unit 120 takes charge of an interface necessary for reading, extracting, and recording the data in a general disk including controlling spinning, controlling motions of a head used for reading, extracting, and recording the data, controlling a reading and writing process, logically converting a file storage location related to searching for a data storage location, and the like.

The control unit 130 controls the memory interface unit 120 and the system data storage unit 140 to provide the data requested by a user. Specifically, according to the present example embodiment, the control unit 130 controls the data storage device in order to provide the requested data and the application software related to a processing of the requested data with reference to management information stored in the system data storage unit 140. Specifically, the control unit 130 controls the storage device to provide the requested data and the application software corresponding to a data type requested by the user and a user system feature with reference to the management information stored in the system data storage unit 140.

Also, the control unit 130 may control the data storage device by transmitting, to a user terminal, a processing result of the application software installed in the storage device of the present invention so that a data processing result may be identified even when the application software necessary for the processing of the data requested by the user is not installed in the user terminal.

According to the present example embodiment, the system data storage unit 140 stores the management information including an operating system (OS) of the storage device, the application software, or connection information with the application software processing the data stored in the main storage unit 110. In this instance, the OS or the application software may be stored in the main storage unit 110 instead of the system data storage unit 140. The system data storage unit 140 improves an operating speed of the storage device by using a non-volatile device having an access speed higher than the access speed of the main storage unit 110, for example a flash memory. However, the system data storage unit 140 may be embodied as a hard disk, a memory card, an optical disk, and the like, similar to the main storage unit 110.

Since the system data storage unit 140 stores the OS necessary for operating the storage device according to the present example embodiment or basic software and the data, the operating speed may be improved by using the SSD including the flash memory. Also, the user data processing speed may be enhanced by storing the data frequently accessed by the user in the system data storage unit 140 as required.

Also, the control unit 130 operates the OS stored in the main storage unit 110 or the system data storage unit 140, and generates and controls a consecutive control signal necessary for executing the application software operating in the OS. Also, depending on an OS type that is used, the control unit 130 generates different control signals and controls the data storage device according to the present example embodiment. Specifically, since the data storage device according to the present example embodiment includes its own OS, the control unit 130 operates the OS and controls various application software.

Specific configurations and operations of the control unit 130 and the system data storage unit 140 are described with reference to FIG. 3 and FIG. 4.

The network interface unit 150 transmits the data requested by the user. The network interface unit 150 may include any one or a plurality of various data input/output interfaces including a local area network (LAN), a wireless LAN, IEEE1384, and the like. Since the network interface unit 150 is included, the data storage device has a server function of independently providing the data for users accessing the data storage device of the present invention.

The network interface unit 150 using the Internet, a wireless LAN, and the like may be optionally included. An example embodiment that transceives the data to/from a remote user terminal using the network interface unit 150, or performs the server function using the data storage device according to the present example embodiment is described with reference to FIG. 7 below.

When the network interface unit 150 is excluded, the control unit 130 includes an external input/output interface unit including a Universal Serial Bus (USB) interface, a serial port, and the like. When the data storage device is connected with the user terminal using the network interface unit 150, the data storage device according to the present example embodiment may transmit the data to the user terminal. Accordingly, as described with reference to FIG. 8, the data storage device may be connected with the user terminal, and transmit and replay the data. Specifically, when the data storage device according to the present example embodiment excludes an external display unit such as a liquid crystal display (LCD), the data storage device transmits the stored data to an outside, and the user terminal having received the data replays the data. In this instance, the application software necessary for processing the data is provided together, and the received data may be processed without a program installed it the user terminal.

Also, even when the application software necessary for processing the data requested by the user is not installed in the user terminal, the data processing result may be obtained by transmitting, to the user terminal, the processing result of the application software installed in the storage device of the present invention. For example, when the user requests a Joint Photographic Experts Group (jpg) format file, the user terminal enables the data to be displayed using a display unit when jpg data is processed using the software installed in the storage device and is transmitted to the user terminal even when software seeing the jpg file is not installed in the user terminal. Accordingly, the jpg file requested by the user may be seen.

When the network interface unit 150 is included, the control unit 130 controls data transmission using the network interface unit 150. Specifically, the control unit 130 finds the data desired by the user and the software for processing the data with reference to the management information as an example, as described with reference to FIG. 5 below, and transmits the data and the software using the network interface unit 150. Accordingly, the user may remotely receive the data stored in the storage device according to the present example embodiment, and the software processing the data. Therefore, even when an application program is not installed in the remote user terminal, the data may be processed and replayed.

As described above, according to the present example embodiment, a function of the storage device including a simple structure and excluding a user interface may be performed, and the server function including a network access unit and simultaneously processing data requests from several users may be performed.

FIG. 1B is a block diagram illustrating a data storage device according to another example embodiment.

Referring to FIG. 1B, the main storage unit 110 and the system data storage unit 140 of FIG. 1A may be integrated as one data storage unit 160. In this case, the data storage device may be embodied more inexpensively and more simply than the data storage device illustrated in FIG. 1A. Specifically, the main storage unit 110 storing system data is included in the data storage unit 160 being a mass storage device. Accordingly, since the system data storage unit 140 being relatively expensive is eliminated, the data storage device may be embodied inexpensively and simply.

As is obvious with reference to FIG. 2A and FIG. 2B described as follows, the main storage unit 110 of FIG. 1A may be embodied in various forms. Specifically, the main storage unit 110 may be embodied in various forms including a hard disk, an optical disk, a memory card, and the like, or may be embodied in SSD form such as a flash memory, or may include the hard disk or the optical disk, and the SSD. The data storage unit 160 may be segmented, a portion of the data storage unit 160 may store user data, and another portion of the data storage unit 160 may store system data.

Figure 1C:
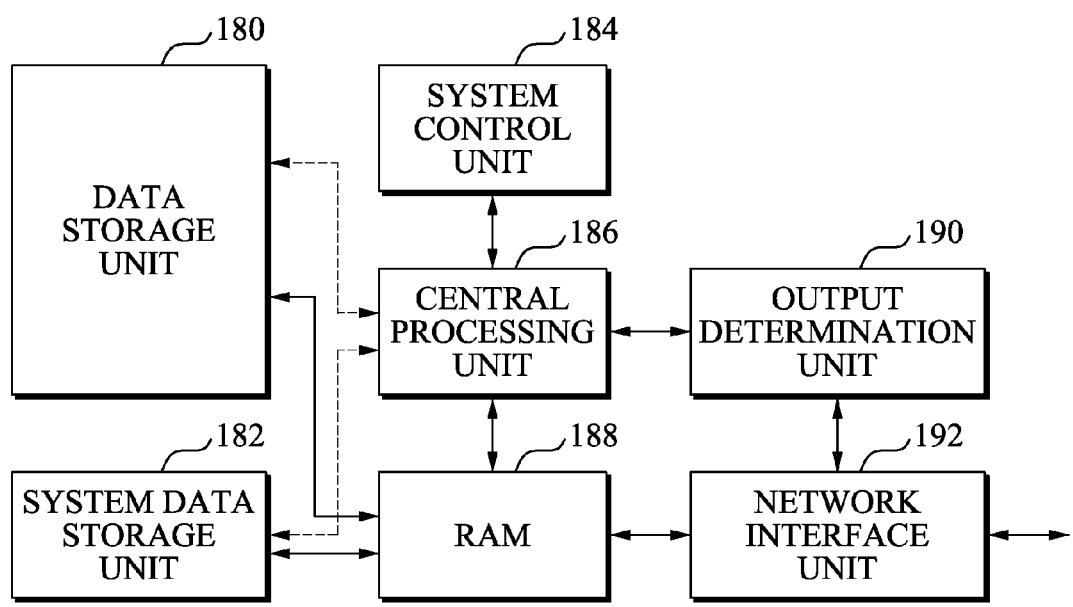
FIG. 1C is a block diagram illustrating a data storage device according to still another example embodiment.

FIG. 1C is a block diagram illustrating a data storage device according to still another example embodiment.

The data storage device of the present invention includes a data storage unit 180, a system data storage unit 182, a system control unit 184, a central processing unit (CPU) 186, a random access memory (RAM) 188, an output determination unit 190, and a network interface unit 192.

The data storage unit 180 stores user data and the like as a mass storage device. The data storage unit 180 may be a conventional general mass storage device including a hard disk, an optical disk, and the like, or may be a storage medium including a memory card, and the like, or may be a mass storage device in SSD form.

The system data storage unit 182 stores an application program used for the storage device according to the present example embodiment, an OS, and management information related to a processing of the data stored in the data storage unit 180. The management information is similar to the management information described with reference to FIG. 1A and FIG. 1B. The system control unit 184 performs an initialization, a control, and a system setting of the storage device. Specifically, the system control unit 184 performs the storage device's own control function including the initialization and the setting of the device, and the like.

The CPU 186 performs data processing including data read and data write and processes an instruction word. Specifically, the CPU 186 processes the data stored in the data storage unit 180 and the system data storage unit 182. For example, the CPU 186 executes the application program installed in the system data storage unit 182, processes the data stored in the data storage unit 180, and outputs a processing result.

The RAM 188 is a temporary memory device. The RAM 188 loads the data from the data storage unit 180 and the system data storage unit 182, loads the instruction word of the CPU 186, and temporarily stores a data processing result of the instruction word being performed. The output determination unit 190 determines to output, based on a selection of a user, at least one from among the data stored in the data storage unit 180, the application program, and the data processing result of data processed by the CPU 186. Specifically, the output determination unit 190 determines whether to provide the data stored in the data storage unit 180, or whether to provide the data and the application program stored in the system data storage unit 182, or whether to provide the data processing result of the application program.

The network interface unit 192 is an optional component. When the network interface unit 192 is included, the CPU 186 and the output determination unit 190 manage data transmission using the network interface unit 192. Specifically, the network interface unit 192 transmits the data determined by the output determination unit using the network interface unit 192.

Figure 2A:
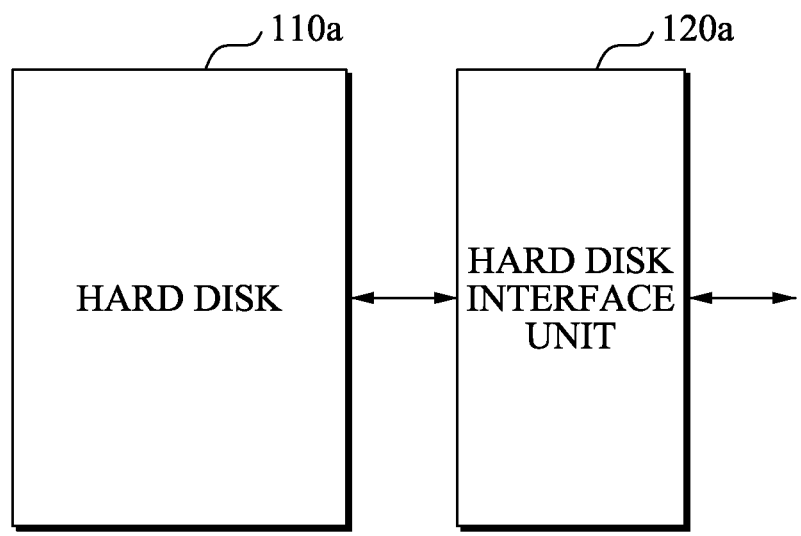
FIG. 2A is a block diagram illustrating a main storage unit using a hard disk according to an example embodiment.
Figure 2B:
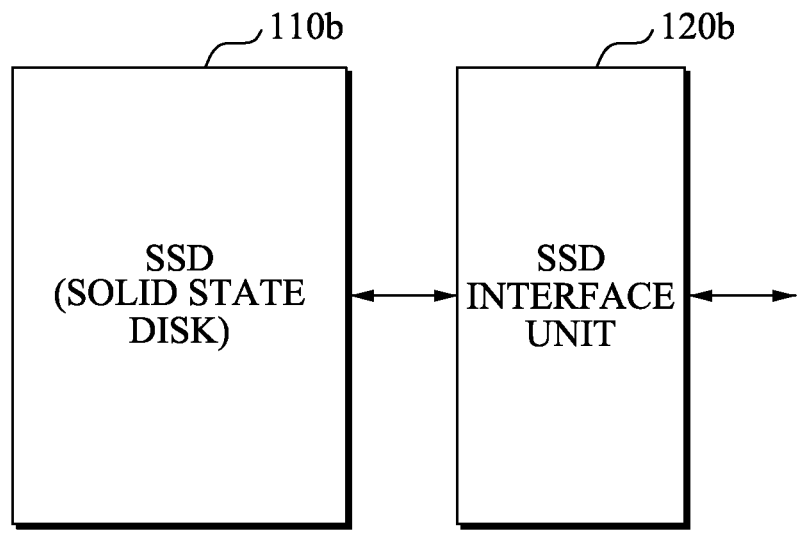
FIG. 2B is a block diagram illustrating a main storage unit using a Solid State Disk (SSD) according to an example embodiment.

FIG. 2A is a block diagram illustrating a main storage unit using a hard disk 110a according to an example embodiment, and FIG. 2B is a block diagram illustrating a main storage unit using an SSD according to an example embodiment.

Referring to FIG. 2A, when the hard disk 110a is used as the main storage unit, a memory interface unit is a hard disk interface unit 120a, and the hard disk interface unit 120a controls a physical motion of a disk including controlling spinning of the hard disk, controlling a motion of a head, and the like. The hard disk 110a includes a physical driving unit for data read and data write. Since the desired data is accessed by moving the driving unit and finding a data storage location, an access speed of the data is limited. Also, an optical disk may be used as the main storage unit. In this case, the memory interface unit is an optical disk interface unit.

Referring to FIG. 2B, when an SSD 110b is used as the main storage unit, the memory interface unit is an SSD interface unit 120b. The physical spinning or the motions of the head are unnecessary for reading, extracting, and recording the data. Accordingly, in this case, the SSD interface unit 120b performs storage location search of the data, logic conversion of a data storage address, and the like.

Figure 2C:
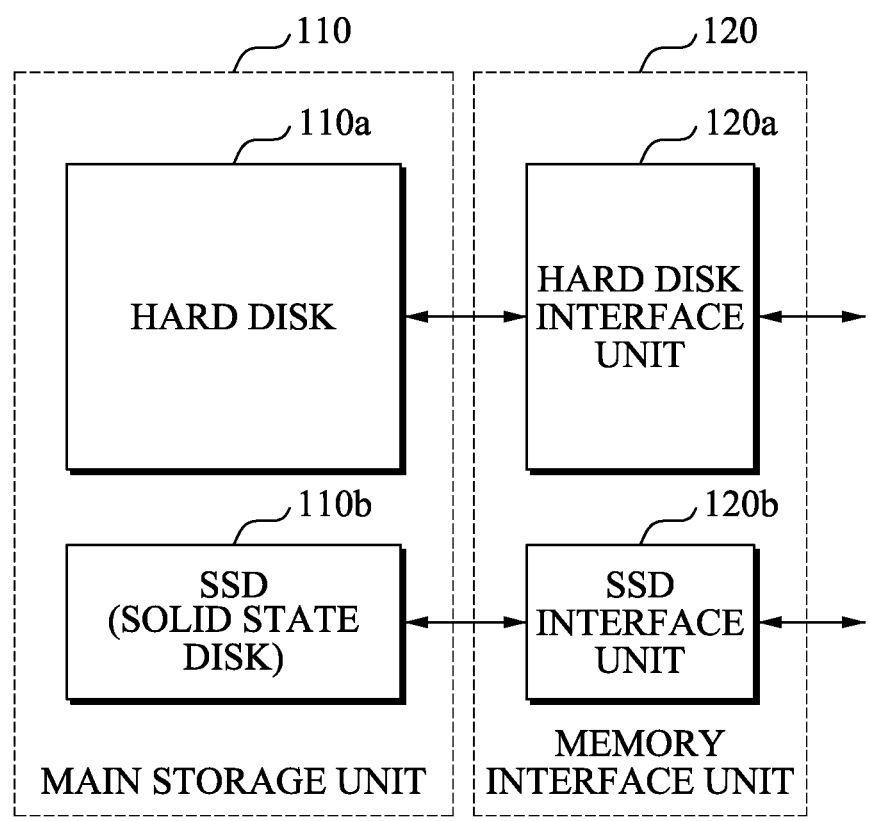
FIG. 2C is a block diagram illustrating a main storage unit using both a hard disk and an SSD according to an example embodiment.

FIG. 2C is a block diagram illustrating a main storage unit 110 using both the hard disk 110a and the SSD 110b according to an example embodiment.

Since the hard disk needs to move a driving unit to perform data read and data write, an access speed of data decreases, and physical noise and the like are generated. However, the hard disk may be relatively inexpensively embodied as a mass storage. Also, the SSD has a high data access speed, however, the SSD is relatively expensive. Accordingly, as illustrated in FIG. 2C, the data may be efficiently managed by enabling the main storage unit 110 to include both the hard disk 110a and the SSD 110b, and by storing the frequently-accessed data in the SSD 110b and storing other data in the hard disk 110a.

Also, since the main storage data unit 110 includes both the hard disk 110a and the SSD 110b, a memory interface unit 120 includes both a hard disk interface unit 120a and an SSD interface unit 120b. When the main storage unit 110 uses a memory card, an interface unit controlling the memory card is included. In the case of FIG. 2C, an optical disk may be used instead of the hard disk.

Figure 3:
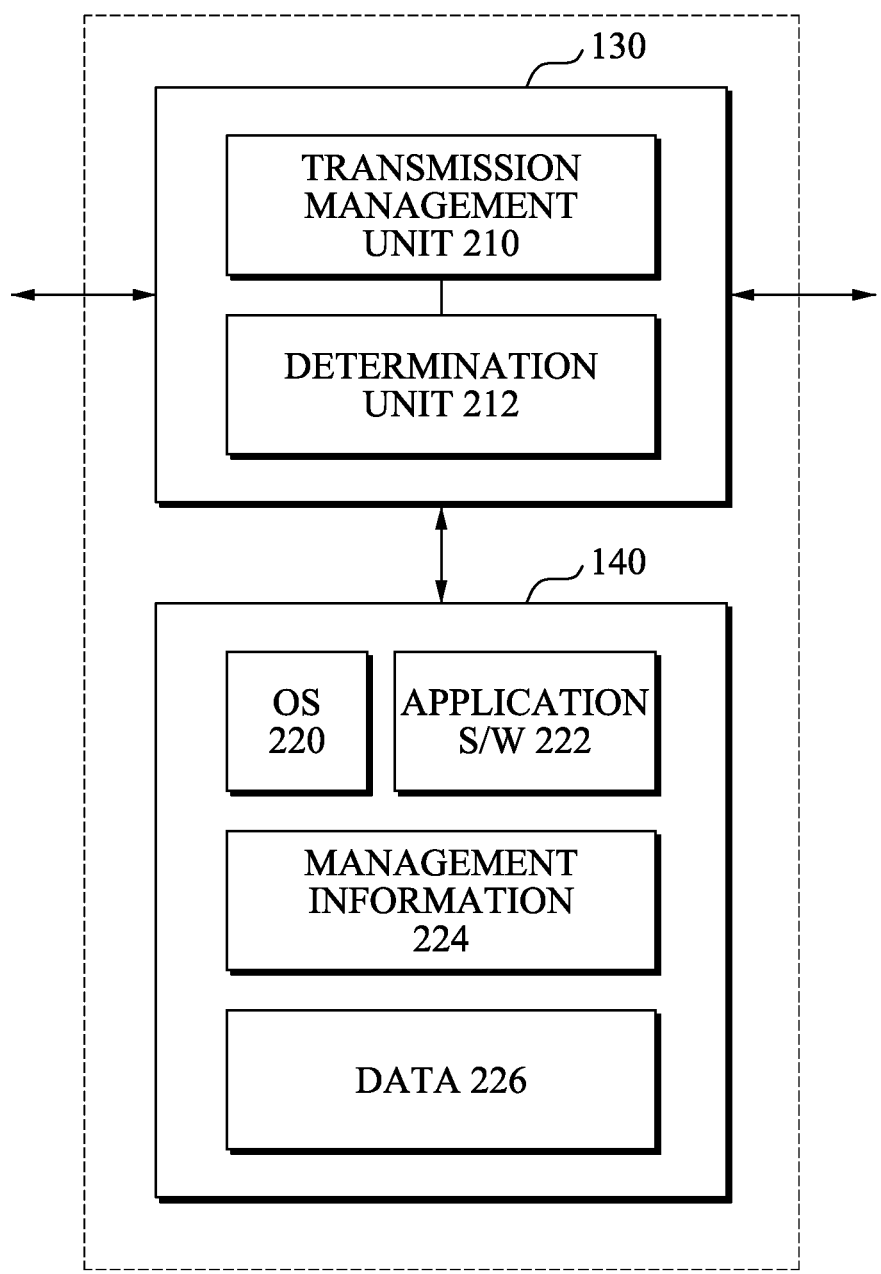
FIG. 3 is a block diagram illustrating a control unit and a system data storage unit of FIG. 1A.

FIG. 3 is a block diagram illustrating the control unit 130 and the system data storage unit 140 of FIG. 1A.

The control unit 130 specifically includes a transmission management unit 210 and a determination unit 212. Also, the system data storage unit 140 stores an OS 220, application software 222, management information 224, and data 226.

The determination unit 212 determines a data type requested by a user and a user system feature. For example, the determination unit 212 identifies whether data requested by the user is a picture file using an extension "jpg", a movie file using a Moving Picture Experts Group format file extension "mpg", and the like. Also, the determination unit 212 identifies the feature of the user system processing the requested data, for example, the specific feature concerning whether the OS of the user system is WINDOWS®, LINUX®, and the like, and in the case of WINDOWS® being the OS whether WINDOWS® version is XP or another version.

Also, the determination unit 212 transceives a control signal to/from a user terminal in order to find the data type requested by the user and the user system feature. Specifically, the user transmits system feature information of the user terminal together while requesting data "a file name". The information is not manually inputted from the user, and the user terminal checks its own feature information and transmits the feature information and a data request signal to the determination unit 212.

The determination unit 212 may also analyze a specific portion of a file including an extension of a data file, the feature information included in a header of the data file, and the like, and acquire specific information of the data file. For example, the determination unit 212 may analyze the header of the movie file, for example, an "mpg" file, and find the data type, version information, compatibility information for a program, and the like. Accordingly, a most suitable application software related thereto may be selected.

Also, the transmission management unit 210 controls reading of the application software, which corresponds to the management information, in the main storage unit 110 or the system data storage unit 140 with reference to the management information read by the system data storage unit 140 based on the data feature determined by the determination unit 212, and providing the application software. Also, since the data storage unit of the present invention may output a data processing result of an application program to an outside, the transmission management unit 210 may control transmitting an execution result of the application software.

As described above, the OS 220 stored in the system data storage unit 140 is an OS necessary for operating the data storage device according to the present example embodiment. The application software 222 is software related to a processing of the data requested by the user. For example, there are a picture board program reproducing a "jpg" file, a media player program playing an "mpg" file, and the like. The application software 222 is included in various versions depending on features of various user terminals. Specifically, since application software of a version appropriate for the feature information of the user terminal and the feature information of the data file acquired by the determination unit 212 is required to be transmitted, various types of the application software 222 are included.

Also, the application software 222 may be various application programs depending on a use of the storage device according to the present example embodiment. When the storage device of the present invention is used as an image file viewer, similar to the above-described example, the application software 222 may be various image processing programs including the picture board program processing and displaying an image data file and the like, or playing programs of music files. When the storage device of the present invention is used as a movie playing device, the application software 222 may be a movie playing program that processes and displays a movie data file. As described above, the application software 222 of the present invention is the application program necessary for processing the data stored in the data storage device of the present invention.

Also, various application software may be included depending on one file feature. For example, in the case of the "mpg" file, a playing program and a separate editing program that edits the "mpg" file may be included and be provided by selection of the user. As described above, in the case of the editing program, the various application software may be included depending on various version information.

The management information 224 stores a relation among the data requested by the user, the software necessary for processing the data, and the user system. For example, when the user selects and requests the "jpg" file in a computer with a WINDOWS XP® OS environment using the data storage device according to the present example embodiment, the management information 224 stores information about which program stored in the system data storage unit 140 is required to be selected and provided. Accordingly, the data requested by the user and the software necessary for processing the data may be automatically selected and be provided together, or the software may be executed in the data storage device of the present invention and the execution result may be outputted by transmitting a reference result to the transmission management unit 210 with reference to the management information 224 depending on the determination result of the determination unit 212. A specific example embodiment of the management information 224 is described with reference to FIG. 5 below.

Also, the data 226 is data for quickly accessing the frequently-accessed data from among the data stored in the main storage unit 110, or the data stored by the user's selection.

Figure 4:
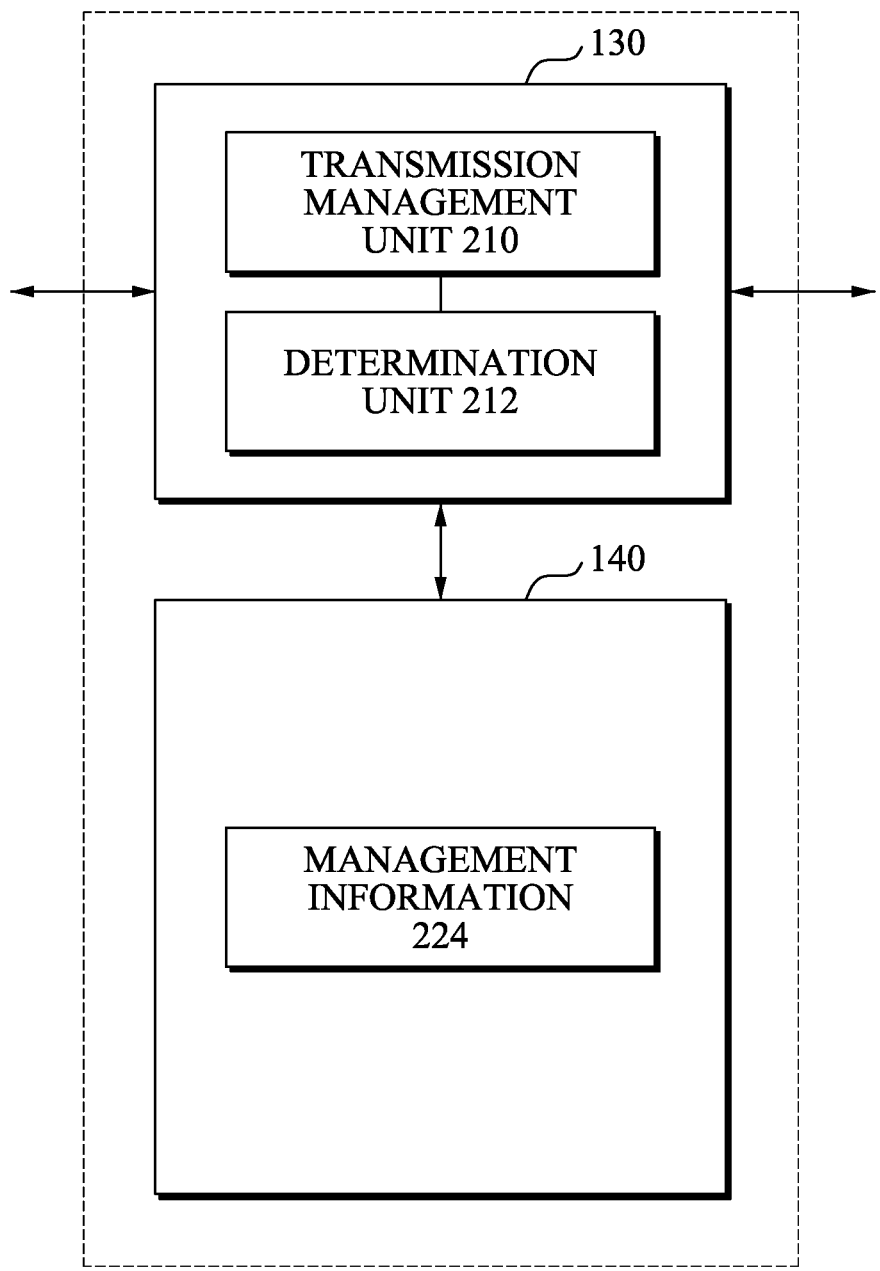
FIG. 4 is a block diagram illustrating a control unit and a system data storage unit of FIG. 1A, according to another example embodiment.

FIG. 4 is a block diagram illustrating the control unit 130 and the system data storage unit 140 of FIG. 1A, according to another example embodiment.

Referring to FIG. 4, the system data storage unit 140 may basically store only the management information 224, while the OS 220, the application software 222 or the data 226 may be stored in the main storage unit 110. Since a volume of the system data storage unit 140 is limited, the data and the user data may be stored in the main storage unit 110 as required.

Also, referring to FIG. 1B, as described above, when a system data storage unit is not separated and is integrated into the data storage unit 160, the management information 224 may be stored in the data storage unit 160. In FIG. 1B, an area of the data storage unit 160 may be allocated so that the OS 220 and the application software 222 may be stored in a specific area of the data storage unit 160, and the management information 224 may be stored in another specific area.

FIG. 5 is a table illustrating management information according to an example embodiment.

Referring to FIG. 5, for example, when a user system requesting a file with an extension of "jpg" is a WINDOWS XP® OS, management information is as illustrated in the table in order to be provided to a program "mpaint_xp_1.exe". When the user system is a LINUX® OS, the management information is as illustrated in the table in order to be provided to a program "mpaint_linux_1.exe".

This is similar to the case of a file with an "mpg" extension. Also, when the user system being the WINDOWS XP® OS requests the file with the "mpg" extension, a file "media_editor_1.exe" editing the file with the "mpg" extension in addition to a file "media_player_xp_1.exe" playing the file with the "mpg" extension may be provided by the user's selection.

A management information table arranges and stores the data requested by the user and the software necessary for processing the data depending on the user system feature.

Also, the management information may be embodied in various types besides a table type. For example, the corresponding application software may be identified with reference to connection information between a data file set in the OS in advance, and an application program. Also, a header of the data file may be directly analyzed without using a table similar to FIG. 5, and the application program corresponding to the header may be directly selected.

Figure 6:
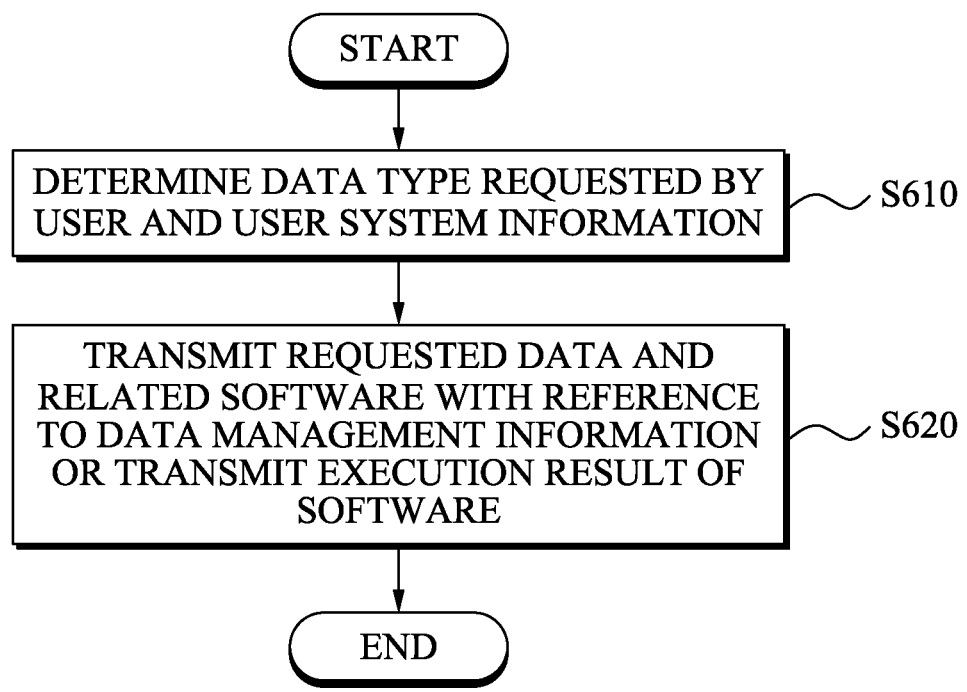
FIG. 6 is a flowchart illustrating a data providing method according to an example embodiment.

FIG. 6 is a flowchart illustrating a data providing method according to an example embodiment.

In operation 610, when a data providing request is received from a user, data type requested by the user and feature information of a user system requesting the data are determined. Similar to the above-described example, when the user accesses the data storage device according to the present example embodiment in a user terminal in a WINDOWS XP® OS and requests a file with a "jpg" extension, it is identified that the data type is a jpg file and user system feature information is WINDOWS XP®.

In operation 620, the requested data and application software corresponding to data management information are transmitted to the user with reference to the data management information, or an execution result of the application software is transmitted. A process of selecting a corresponding program with reference to a management information table being an example of the management information is described above with reference to FIG. 5. Also, the corresponding application software may be identified with reference to connection information between a data file set in advance in the OS installed in the storage device according to the present example embodiment, and an application program. Also, a header of the data file may be directly analyzed without using a table similar to FIG. 5, and the application program corresponding to the header may be directly selected.

Figure 7:
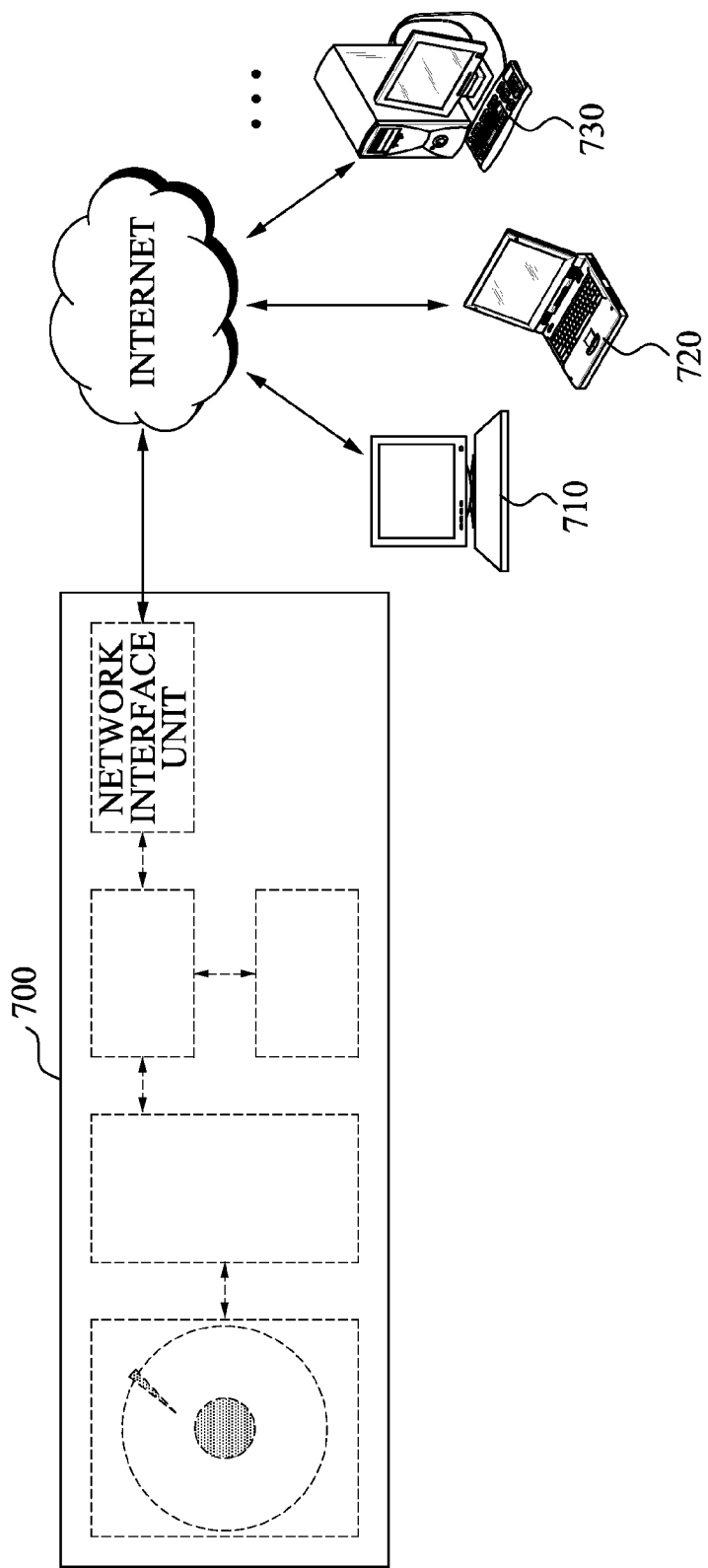
FIG. 7 illustrates an application example of using a data storage device as a server according to an example embodiment.

FIG. 7 illustrates an application example of using a data storage device 700 as a server according to an example embodiment.

Referring to FIG. 7, since the data storage device 700 according to the present example embodiment includes a network interface unit, the data storage device 700 may be applied as a server. Specifically, since the data storage device 700 includes its own OS, installs server software on the OS, and executes the server software, the data storage device 700 may be connected with the Internet, and a data request from several users 710, 720, and 730 accessing the data storage device 700 may be processed.

Each user device 710, 720, and 730 may receive the data stored in the data storage device 700 using the above-described application. Since the application software may be received together or a data processing result of the application software may be received even when the application software necessary for processing the data is not installed, the data may be easily processed.

Also, the data storage device 700 may be applied as the server and a small computer excluding a user interface.

Specifically, a conventional portable hard disk may not provide the application software dealing with the stored data together, and may perform a function as a slave device by providing only an input/output interface such as a USB interface. Also, since a Portable Multimedia Player (PMP), and the like, includes a display unit, a user button, and the like, interaction with the user is possible. However, the PMP and the like are expensive and complex. Additionally, the data storage device according to the present example embodiment may provide a basic function of storing and transmitting the data, and providing the software necessary for processing the data as a simple structure.

Figure 8:
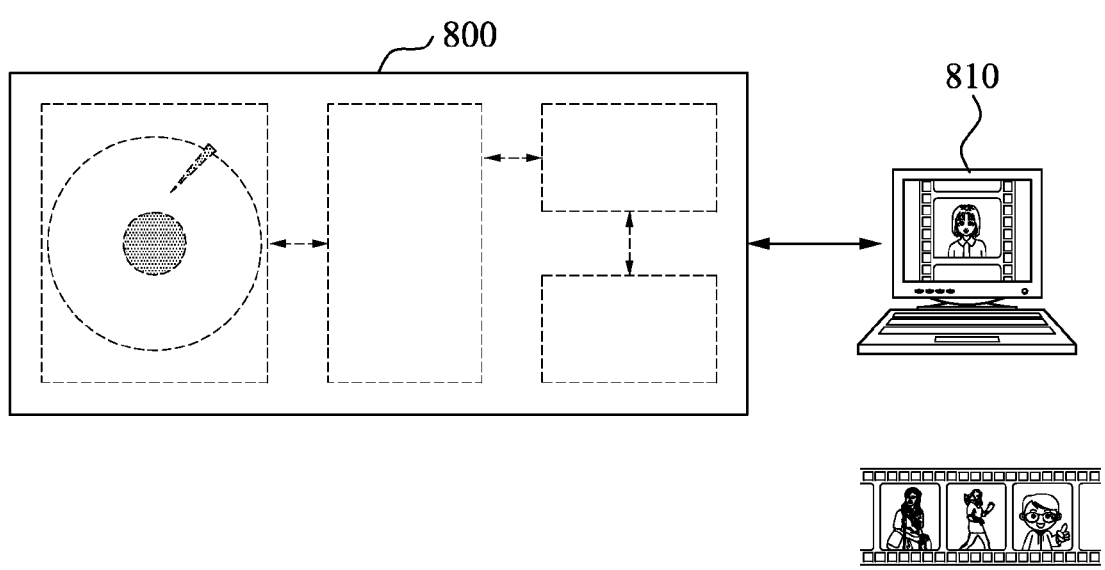
FIG. 8 illustrates an application example of receiving data and application software of the data by using a data storage device and replaying the data and the application software in a user terminal according to an example embodiment.

FIG. 8 illustrates an application example of receiving data and application software of the data by using a data storage device 800 and playing the data and the application software in a user terminal 810 according to an example embodiment.

Referring to FIG. 8, even when a network interface unit similar to the network interface unit in the example of FIG. 7 is excluded, the user terminal 810 may be accessed using a host interface such as a USB interface, and the data and the application software may be transmitted and be playing in the user terminal.

For example, since the data storage device 800 does not maintain its own display unit, a movie file may not be played in the data storage device 800 even though the movie file is stored in the data storage device 800 according to the present example embodiment. Also, when the data storage device 800 according to the present example embodiment is connected with the user terminal 810 using an interface such as a USB interface, the user terminal 810 may receive movie data.

According to a conventional art, when the application software playing the movie data is not installed in the user terminal 810, the received movie may not be played. However, since the data storage device 800 according to the present example embodiment may transmit the movie data and the application software appropriate for the user terminal 810, the movie may be played even when the software playing the movie data is not installed in the user terminal 810. Also, the user terminal 810 may be used to perform only a function of a display by executing the application software in the storage device 800 according to the present example embodiment and transmitting an execution result to the user terminal 810.

Also, since the application software that simply plays the movie data, and edits or processes the movie data may be also received, various operations are possible. The present example embodiment describes the movie data as an example, however, the application software necessary for processing the data of various types including image data, text data, document data, and the like may be similarly applied.

Figure 9:
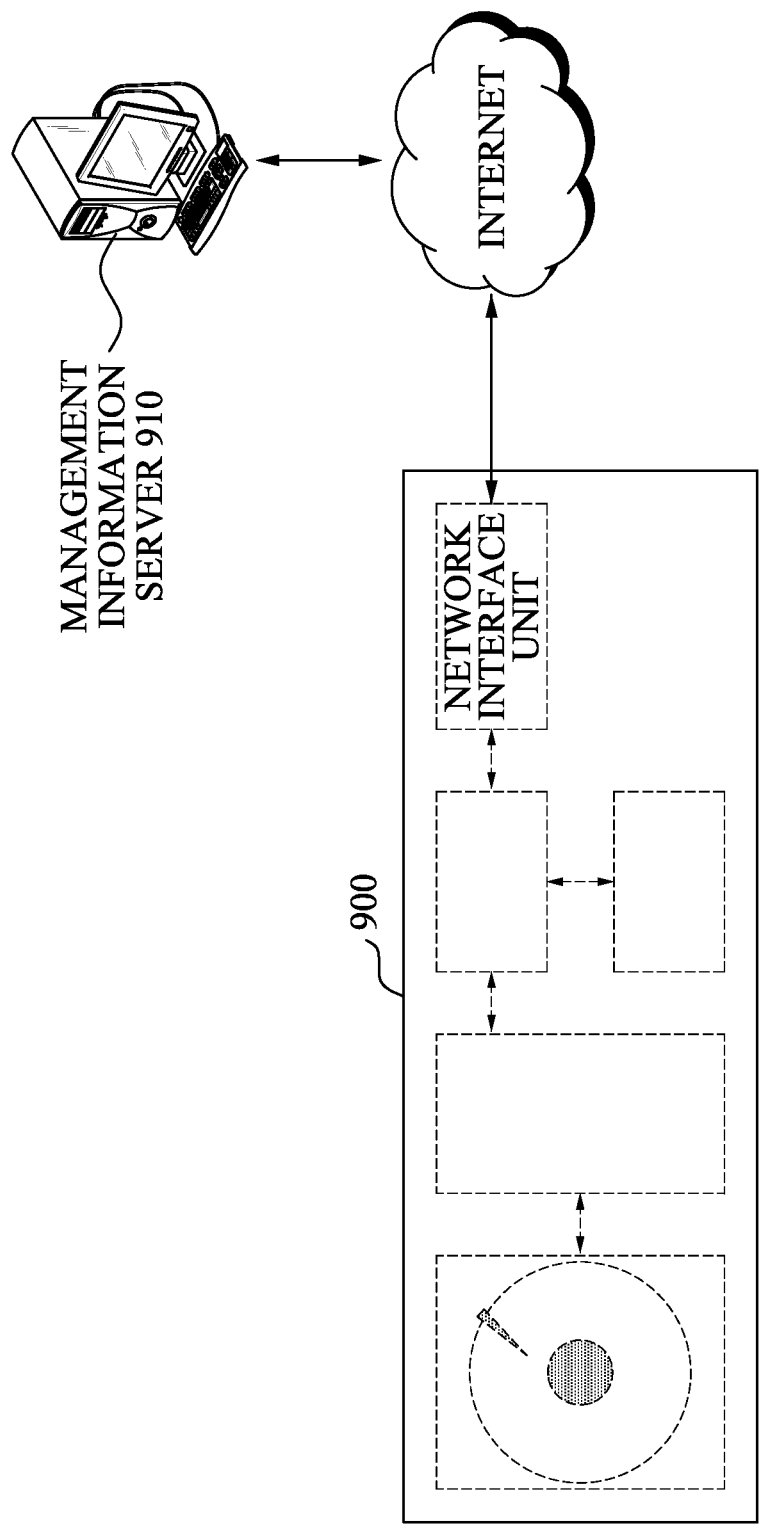
FIG. 9 illustrates an application example of receiving management information from a server and using the management information according to an example embodiment.

FIG. 9 illustrates an application example of receiving management information from a server and using the management information according to an example embodiment.

Specifically, a data storage device 900 according to the present example embodiment may download data requested by a user, software necessary for processing the data, and management information denoting a relation with a user system from a management information server 910 via a network, and process the data, the software, and the management information.

The management information stored in the storage device 900 in advance may be updated as contents stored in the management information server 910, and may be used or stored by downloading the management information from the management information server 910 even when the management information is not stored in the storage device 900.

Also, the above-described data providing method may be recorded in a computer program. Codes configuring the program and code segments may be obvious to a computer programmer of a related field. Also, the program is stored in computer-readable information storage media, and is read and executed by a computer, thereby embodying the data providing method. The information storage media includes magnetic recording media, optical recording media, and carrier wave medium.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims and their equivalents.

While example embodiments have been particularly shown and described, it will be understood by those of ordinary skill in the art that various changes in form and details may be made therein without departing from the spirit and scope of the present invention as defined by the following claims.

What is claimed is:

1. An external data storage device that connects to a user terminal device, the device comprising:
   a data storage unit configured to store data files;
   a network interface unit configured to connect the data storage device to user terminals, comprising the user terminal device, and receive, from the user terminal device, a request for a data file requested by a user of the user terminal device;
   a system data storage unit configured to store a plurality of application software configured to process the data files, and store management information comprising relations between data types of the data files, operating system types of operating systems of the user terminals, and information of the plurality of application software;
   a control unit configured to receive, from the user terminal device without user manipulation, an operating system type of an operating system of the user terminal device, determine a data type of the requested data file, and determine an application software configured to process the determined data type on the operating system of the user terminal device, based on the determined data type, the received operating system type, and the management information;
   a central processing unit configured to process the requested data file, using the determined application software, to generate a processing result;
   a random access memory configured to load the requested data file from the data storage unit, load the determined application software and the management information from the system data storage unit, and temporarily store the processing result;
   an output determination unit configured to determine whether to output, to the user terminal device, the requested data file and the determined application software, or the processing result; and
   a server operating system installed therein that is configured to simultaneously process requests from the user terminals.

2. The data storage device of claim 1, wherein the management information comprises an operating system of the data storage device, or the plurality of application software, or connection information with the plurality of application software processing the data files.

3. The data storage device of claim 1, wherein the network interface unit is configured to transmit the requested data file to the user terminal device based on a control signal generated by the output determination unit.

4. The data storage device of claim 1, wherein the data storage unit comprises a hard disk comprising a physical driving unit for data read and data write.

5. The data storage device of claim 1, wherein the data storage unit comprises an optical disk or a solid state disk comprising a flash memory.

6. The data storage device of claim 1, wherein the system data storage unit comprises a mass storage device comprising a hard disk, or an optical disk, or a solid state disk comprising a flash memory.

7. An external data storage device that connects to a user terminal device, the device comprising:
   a main storage unit configured to store data files;
   a network interface unit configured to connect the data storage device to user terminals, comprising the user terminal device, and receive, from the user terminal device, a request for a data file requested by a user of the user terminal device;
   a system data storage unit configured to store a plurality of application software configured to process the data files, and store management information comprising relations between data types of the data files, operating system types of operating systems of the user terminals, and information of the plurality of application software;
   a central processing unit configured to process the data files, using the plurality of application software, to generate a processing result;
   a server operating system installed therein which is configured to simultaneously process requests from the user terminals; and
   a control unit configured to
      control the main storage unit, an operating system of the data storage device, and the plurality of application software stored in the system data storage unit,
      receive, from the user terminal device without user manipulation, an operating system type of an operating system of the user terminal device,
      determine a data type of the requested data file,
      determine an application software configured to process the determined data type on the operating system of the user terminal device, based on the determined data type, the received operating system type, and the management information, and
      determine whether to provide, to the user terminal device, the requested data file and the determined application software, or a result of processing the requested data file, using the determined application software.

8. The data storage device of claim 7, wherein the control unit is configured to control network interface unit to provide, to the user terminal device, the requested data file and the determined application software.

9. The data storage device of claim 7, wherein the management information comprises operating system information of the data storage device, or the plurality of application software, or connection information with the plurality of application software processing the data files.

10. The data storage device of claim 7, wherein the network interface unit is configured to receive the requested data file from the control unit, and transmit the received data file to the user terminal device.

11. The data storage device according to claim 8, wherein the control unit comprises:
   a determination unit configured to determine the data type of the requested data file, and the received operating system type; and
   a transmission management unit configured to read the determined application software from the main storage unit or the system data storage unit based on information of the determined application software, among the information of the plurality of the application software in the management information, which corresponds to the determined data type and the determined operating system type, and control the network interface unit to provide, to the user terminal device, the read application software.

12. The data storage device of claim 7, wherein the main storage unit comprises a hard disk comprising a physical driving unit for data read and data write.

13. The data storage device of claim 7, wherein the main data storage unit comprises an optical disk or a solid state disk comprising a flash memory.

14. The data storage device of claim 7, wherein the system data storage unit comprises a hard disk, or an optical disk, or a solid state disk comprising a flash memory.

15. The data storage device of claim 7, wherein the main storage unit or the system data storage unit comprises a memory card.

16. The data storage device according to claim 7, wherein the management information is transmitted from a management information server connected via a network.

17. An external data storage device that connects to a user terminal device, the device comprising:
   a network interface unit configured to connect the data storage device to user terminals, comprising the user terminal device, and receive, from the user terminal device, a request for a data file requested by a user of the user terminal device;
   a data storage unit configured to store data files, a plurality of application software configured to process the data files, and management information comprising relations between data types of the data files, operating system types of operating systems of the user terminals, and information of the plurality of application software;
   a central processing unit configured to process the data files, using the plurality of application software, to generate a processing result;
   a server operating system installed therein that is configured to simultaneously process requests from the user terminals; and
   a control unit configured to
      control the data storage unit, operating system of the data storage device, and the plurality of application software stored in the data storage unit,
      receive, from the user terminal device without user manipulation, an operating system type of an operating system of the user terminal device,
      determine a data type of the requested data file,
      determine an application software configured to process the determined data type on the operating system of the user terminal device, based on the determined data type, the received operating system type, and the management information, and
      determine whether to provide, to the user terminal device, the requested data file and the determined application software, or a result of processing the requested data file, using the determined application software.

18. The data storage device of claim 17, wherein the management information comprises an operating system of the data storage device, or the plurality of application software, or connection information with the plurality of application software processing the data files.

19. The data storage device of claim 17, wherein the data storage unit comprises a memory card, or an optical disk, or a solid state disk comprising a flash memory.

20. The data storage device according to claim 17, wherein the management information is transmitted from a management information server connected via a network.

21. The data storage device according to claim 17, wherein the network interface unit is configured to receive the requested data file from the control unit, and transmit the received data file to the user terminal device.

22. A data providing method in an external storage device that connects to a user terminal device, the method comprising:
   connecting the storage device to user terminals, comprising the user terminal device;
   receiving a request for a data file from the user terminal device;
   receiving, from the user terminal device without user manipulation, an operating system type of an operating system of the user terminal device;
   determining a data type of the requested data file;
   determining an application software configured to process the determined data type on the operating system of the user terminal device, based on the determined data type, the received operating system type, and management information comprising relations between data types of data files, operating system types of operating systems of the user terminals, and information of a plurality of application software configured to process the data files;
   determining whether to provide, to the user terminal device, the requested data file and the determined application software, or result of processing the requested data file, using the determined application software,
   in response to the result being determined to be provided to the user terminal device, processing the requested data file, using the determined application software, to generate the result, and providing the result to the user terminal device,
   wherein the external storage device comprises a server operating system installed therein that is configured to simultaneously process requests from the user terminals.

23. The method of claim 22, wherein the management information is stored in a storage space separate from a storage space of the requested data file.

24. The method of claim 22, wherein the management information is transmitted from a management information server connected via a network.

25. The method of claim 22, wherein the plurality of application software is stored in a space storing the management information, or a space storing the data files.

26. The method of claim 25, wherein an operating system of the storage device is further stored in the space storing the management information, or the space storing the data files, and the operating system of the storage device manages the storage device.

27. The method of claim 25, wherein the space storing the management information or the space storing the data files comprises a memory card, or a hard disk, or an optical disk, or a solid state disk comprising a flash memory.

28. The method of claim 22, wherein:
   the determining of the application software comprises selecting, from the information of the plurality of the application software in the management information, information of the application software that corresponds to the determined data type and the received operation system type; and
   in response to the requested data file and the determined application software being determined to be provided to the user terminal device, providing, to the user terminal device, the requested data file and the determined application software.

29. The method of claim 28, wherein the providing of the determined application software comprises reading the determined application software based on the selected information of the application software.

30. The method of claim 22, wherein the determining of application software comprises:
   finding a relation between the determined data type and the received operating system type, among the relations in the management information; and determining, in the found relation, the application software.

* * * * *